United States Patent [19]

Johnson

[11] 4,233,960
[45] Nov. 18, 1980

[54] HEAT STORAGE APPARATUS AND METHOD

[76] Inventor: Steven A. Johnson, 136 N. First West, Preston, Id. 83772

[21] Appl. No.: 926,680

[22] Filed: Jul. 21, 1978

[51] Int. Cl.³ .......................... F24J 3/02; F24H 7/00; B01F 9/00
[52] U.S. Cl. .................................. 126/430; 126/400; 126/435; 126/436; 165/104 S; 366/235; 366/274
[58] Field of Search ............... 126/270, 271, 400, 428, 126/430, 432, 435, 436, 437; 237/1 A; 165/104 S, 107, 18; 366/235, 273, 274

[56] References Cited

U.S. PATENT DOCUMENTS

| | | | |
|---|---|---|---|
| 951,978 | 3/1910 | Willson, Jr. | 366/235 |
| 3,971,167 | 7/1976 | van Moppes | 366/235 |
| 4,117,882 | 10/1978 | Shurcliff | 126/400 X |
| 4,154,292 | 5/1979 | Herrick | 126/400 |

OTHER PUBLICATIONS

"Rolling Cylinder" Heat Storage Device, Mechanical Engineering, Mar. 1978, p. 55.

Primary Examiner—Carroll B. Dority, Jr.
Assistant Examiner—Lee E. Barrett
Attorney, Agent, or Firm—J. Winslow Young; H. Ross Workman; Rick D. Nydegger

[57] ABSTRACT

A heat storage apparatus and method including a heat storage medium encapsulated within a container and heat exchange apparatus for exchanging thermal energy with the heat storage medium. The heat storage medium may include a salt having a relatively high latent heat of reaction at a relatively low temperature range. The dehydration reaction of sodium sulfate decahydrate appears to the most promising reaction for this application. Other suitable salts and salt mixtures for other temperature ranges may also be used. The apparatus includes, where necessary, techniques for stirring the heat storage medium to inhibit stratification of the salt during cycles of dissolution and recrystallization or fusion.

15 Claims, 5 Drawing Figures

HEAT STORAGE APPARATUS AND METHOD

BACKGROUND

1. Field of the Invention

This invention relates to heat storage apparatus and, more particularly, to a heat storage apparatus and method utilizing a fusible salt as the heat storage medium.

2. The Prior Art

Conventionally, thermal energy is stored as a temperature rise in a chemically inert medium such as water, metal, rocks and the like. Temperature rise for water is limited by the boiling point of the water. Heat storage at higher temperatures, particularly for solar collector applications, becomes less efficient and more costly because of equipment costs and energy losses from storage and during transfer.

Historically, water is usually considered to be the most suitable material for thermal energy storage primarily because it is inexpensive and has a reasonably high heat capacity. In particular, water has about the highest heat capacity per kilogram per dollar of any oridinary material. However, water requires containment tanks which, in sizes large enough to hold tons of water, are relatively expensive. While the heat conductance of water is rather low, temperature differentials in the water cause the colder water to sink and the warmer water to rise. This creates a relatively rapid internal circulation which transfers heat in spite of the relatively low thermal conductance of water.

Other heat storage systems involve pebble beds or rock piles. The large surface area and tortuous path through the pebble bed insures a very rapid heat exchange. Conduction of heat through the pebble bed itself, with ⅓ of its volume occupied by air spaces between the pebbles, is relatively low because the pebbles have limited areas of contact for heat transfer. The loss of heat through the containing walls to the surrounding atmosphere is thus much reduced. The pebbles also reduce the thermal circulation of the enclosed air by entrapment within the voids. These vivid spaces in a pebble bed further reduce the effective heat storage volume. While the heat capacity of rock is considerably less than that of water, the density of rock is much greater. A cubic foot of solid rock stores about 9.0 kcal/°C. whereas a cubic foot of water stores about 28.3 kcal/° C.

For some special cases, the heat capacity and heat conductance of metals is very good and metals may thus be used for storing heat. On the basis of weight, the heat storage of metals is only 1/10 (iron) and ¼ (aluminum) as much as that of water. However, on the basis of volume the difference is much less because the metal densities are greater although the cost of heat storage by metals is also much greater than by water or rocks.

Heat storage by raising the temperature of a chemically inert material involves the problems of (a) volume of material (b) cost of material, (c) heat transfer to and from the storage unit, and (d) thermal insulation. The latter consideration is important since heat losses occur (1) by conduction to structural materials in contact with the heat-storing substance, (2) by convection in air particularly in windy environments, and (3) by radiation in the infrared. All of these heat losses dictate that the heat-storage unit have as small an external surface area as possible and that it be protected with adequate insulation.

Changes in the physical state and chemical reactions involve much greater thermal effects than temperature changes of inert materials alone. Accordingly, heat storage vessels for chemical reactants can be smaller in size and less expensive. Moreover the operative temperatures may be lower and the operative range narrower so that the cost of insulation is reduced correspondingly. Additionally, some suitable chemicals are relatively inexpensive.

Importantly, the chemical reaction must be easily reversible over a range of temperatures that is not too large. As in many practical chemical operations it is not sufficient to meet the thermodynamic requirements; it is also necessary to have the kinetic reaction favorable so that the reaction will proceed rapidly enough. The simplest chemical heat storage system involves the transition between a solid phase and a liquid phase. Salt hydrates involve this phase change and are among the simplest types of chemicals used for heat storage. A good example of a salt hydrate is sodium sulfate in its transition between the hydrated and the unhydrated crystals:

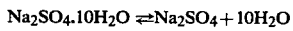

$$Na_2SO_4.10H_2O \rightleftharpoons Na_2SO_4 + 10H_2O$$

When the temperature is raised above 32.3° C. a concentrated solution of the anhydrous salt is formed with the absorption of heat. When the temperature falls below 32.3° C. the anhydrous salt reacts with the water and evolves heat. The heat of reaction is about 50 calories per gram of hydrated salt.

However, after many cycles there is a tendency to develop supersaturated solutions rather than heat-evolving crystallization. Additionally, the crystals tend to settle to the bottom of the container. The resultant stratification of the salt interferes with the reversibility of the transition. The rate of crystallization for sodium sulfate in this environment is about 1.25 cm per hour which sets a limit to the rate of heat evolution.

In view of the foregoing it would be an advancement in the art to provide an apparatus and method whereby improvements are made in the apparatus and method for the chemical storage of heat and which is particularly suitable for use with a solar collector system. Such an apparatus and method is claimed herein.

BRIEF SUMMARY AND OBJECTS OF THE INVENTION

The present invention relates to a novel heat storage and/absorption apparatus and method including a chemical heat storage unit. The heat storage apparatus may also be used in combination with a solar collector. The chemical heat storage unit uses the latent heat of reaction of a suitable salt as the heat storage medium or mechanism. Apparatus is also included for suitably mixing the salt to inhibit stratification of salt.

It is, therefore, a primary object of this invention to provide improvements in heat storage apparatus.

Another object of this invention is to provide improvements in the method of storing heat.

Another object of this invention is to provide an improved heat storage apparatus wherein the heat storage medium is dispersed into a plurality of containers.

Another object of this invention is to provide a heat storage apparatus wherein the heat storage medium containers are rotatably mounted and are adapted to be suitably rotated to inhibit stratification of a heat-storage salt.

Another object of this invention is to provide a plurality of containers wherein each container includes a mixing apparatus for suitably inhibiting the stratification of the heat-storage salt medium contained therein.

Another object of this invention is to provide an improved method for absorbing thermal energy.

These and other objects and features of the present invention will become more fully apparent from the following description and appended claims taken in conjunction with the accompanying drawing.

DETAILED DESCRIPTION OF THE PREFERRED EMBODIMENTS

Figure 1:
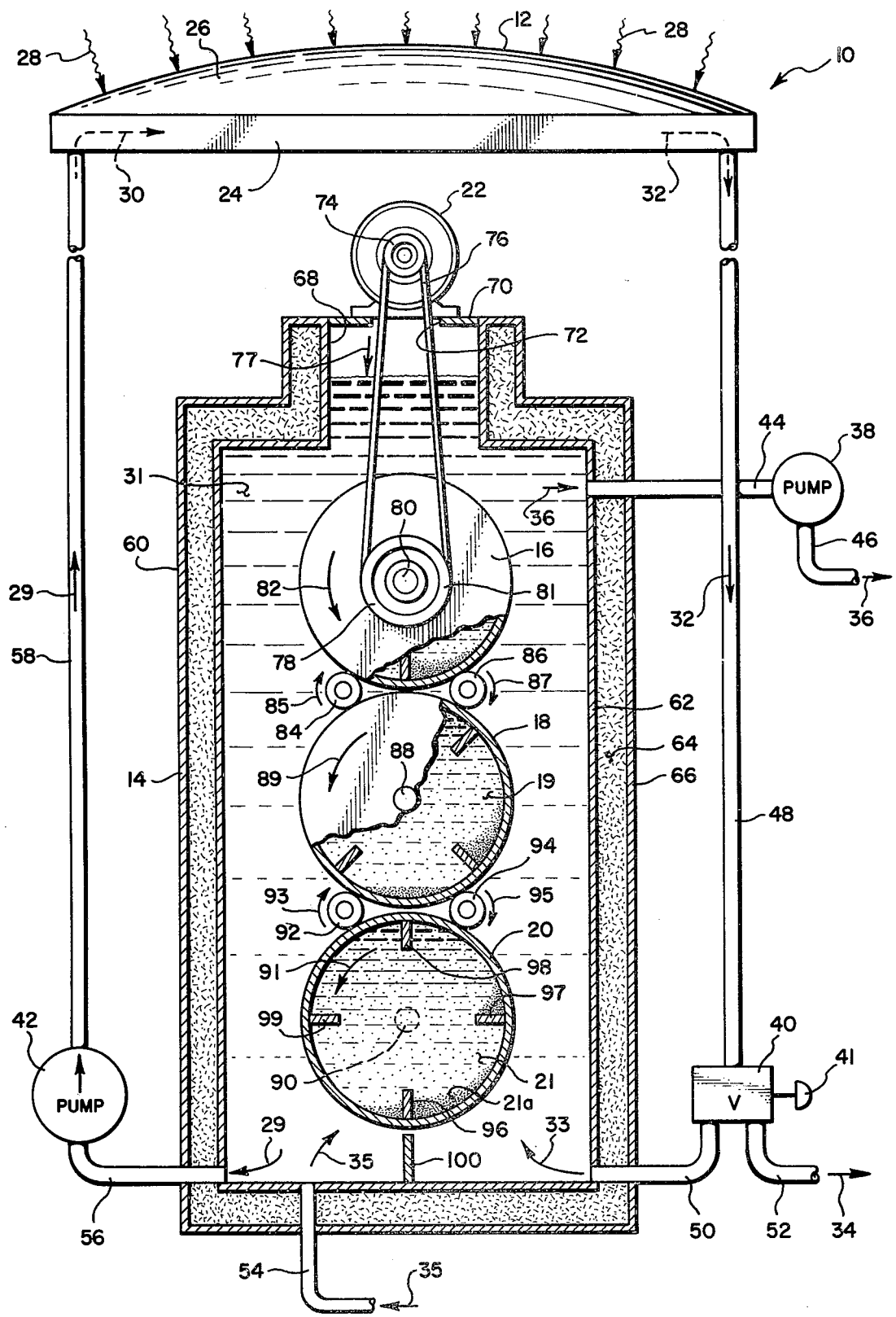
FIG. 1 is an end view of a first preferred embodiment of this invention with portions shown in cross section for ease of illustration.

The invention is best understood by reference to the drawing or in like parts are designated with like numerals throughout.

GENERAL DISCUSSION

Water is commonly considered to be the most suitable material for thermal energy storage primarily because it is cheap and has a reasonably high heat capacity. An alternate means for thermal energy storage is to use the latent heat of a reaction. If the latent heat of reaction is large, this method has the advantage of making smaller systems possible. As a practical matter, two criteria limit reactants that can be considered in such systems: (1) the reaction must occur in the temperature range of interest (normally for solar heating, between about 30-50° C. or cooling, below about 15° C.); and (2) the reacting materials must be as inexpensive as possible.

On the basis of these considerations, the dehydration reaction of sodium sulfate decahydrate ($Na_2SO_4.10H_2O$) appears promising. Considerable work has been done using sodium sulfate decahydrate as the thermal energy storage material. For example, see "Thermal Energy Storage Using Sodium Sulfate Decahydrate and Water" SOLAR ENERGY, Volume 19, pages 99-100, Pergamon Press (1977).

Sodium sulfate decahydrate decomposes peritectically on heating to 32.4° C. to yield anhydrous sodium sulfate and a saturated solution of sodium sulfate in water. Any mixture of this saturated solution and anhydrous sulfate, when cooled below 32.4° C., can undergo the reverse reaction of solution within anhydrous sodium sulfate only as rapidly as water can diffuse through solid sodium sulfate decahydrate to the anhydrous sodium sulfate particles on which the decahydrate particles form. It has also been found that the effective heat storage of such a system rapidly degrades and was not reproducible after five or ten cycles.

Solid state diffusion can be eliminated as a reaction step by using a mixture of decahydrate and water as the starting material (68.2 weight percent sodium sulfate decahydrate and 31.8% water or even a slight excess of water), for example. At 15° C. this mixture consists of 58.1 weight percent sodium sulfate decahydrate and 41.9 weight percent solution of composition having 10.6 weight percent sodium sulfate and 89.4 weight percent water. When the temperature of the mixture is raised, the solubility of the decahydrate increases with the increase in temperature.

With the foregoing composition, all the decahydrate dissolves when the system is heated above about 32° C. The overall composition of the solution then is about 30 weight percent sodium sulfate and 70 weight percent water. If the solution is then cooled from 36° C., as it reaches the liquidus line (liquid solid line or phase diagram) at about 30° C., decahydrate crystals should begin to separate. As the temperature further decreases, the system enters into a two-phase region, sodium sulfate decahydrate and liquid. The stored thermal energy in the system is released when the sodium sulfate decahydrate crystals separate from the solution.

While sodium sulfate decahydrate is probably the most widely preferred salt by reason of its cost, availability, and operative temperature range, other suitable salts and salt mixtures may be used. For example, the addition of predetermined quantities of sodium chloride lowers the melting or hydration temperature of sodium sulfate decahydrate in water. Another salt is sodium thiosulfate which melts at about 50° C.

Advantageously, depending upon the operable temperatures range for the particular salt system chosen, the apparatus and method of this invention can be configurated to either store heat obtained externally for subsequent structure heating or to absorb heat from a structure and discharge the same externally through a cooling apparatus. In each instance the melting or hydration temperature of the salt is the key factor in determining whether to use the salt system for heating or for cooling. For example, a hydration temperature above about 30° C. is preferred for heating applications while a hydration temperature below about 15° C. is preferred for cooling applications.

An example of a salt system suitable for "cold" storage is a eutectic mixture including, by weight, 70% sodium sulfate decahydrate, 3% borax, 6% thickening agent, 10% sodium chloride and 10% ammonium chloride. The borax served as a nucleating agent to inhibit supercooling of the salt solution. The thickening agent may be any suitable thickening agent such as an organic thickening agent (Guar gum) or an inorganic thickening agent (silica gel). Preferrably, the thickening agent should form a thixotropic mixture with the salt system. (In the operation of the invention herein reported the same approximate weight ratios are retained but the thickening agent is omitted to permit circulation without sacrificing the ability of the eutectic mixture to store "cold" at about 15° C.) This eutectic mixture is reported to have a melting temperature of about 12.7° C. Further discussion of such a eutectic mixture may be found in "Solar Energy Storage" by Maria Telkes, Ph.D., *ASHRAE Journal*, pp. 38-44, September 1974.

Although the foregoing temperature ranges are approximate, they generally represent temperatures outside the temperature zone considered comfortable for human habitation, approximately 20° C. to 25° C. Accordingly, a sufficient temperature gradient is thereby maintained to provide adequate heat exchange capability without resorting to extensive heat exchange surfaces.

Figure 2:
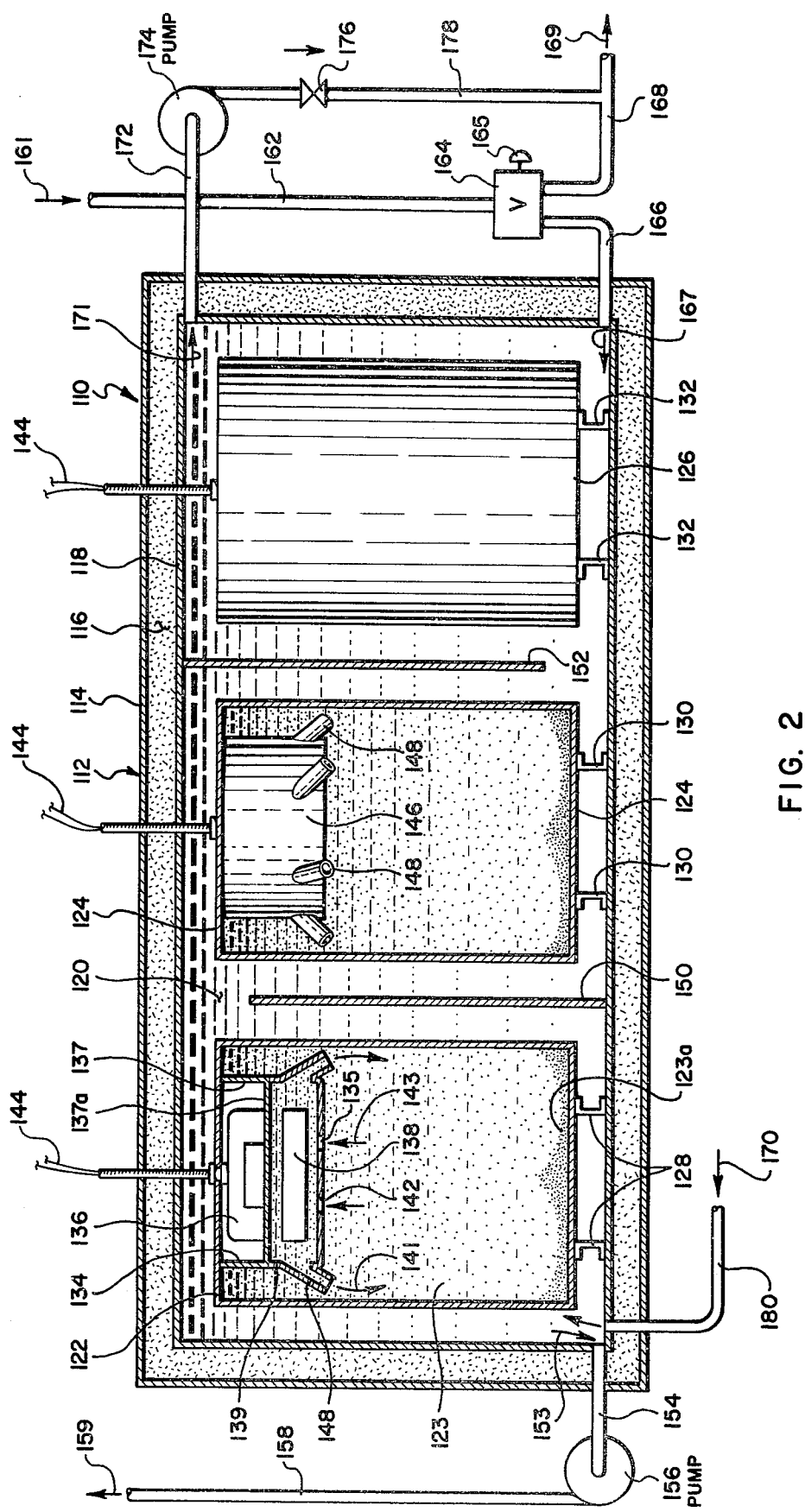
FIG. 2 is a side elevation of a second preferred embodiment of the apparatus of this invention with portions shown in cross section.
Figure 3:
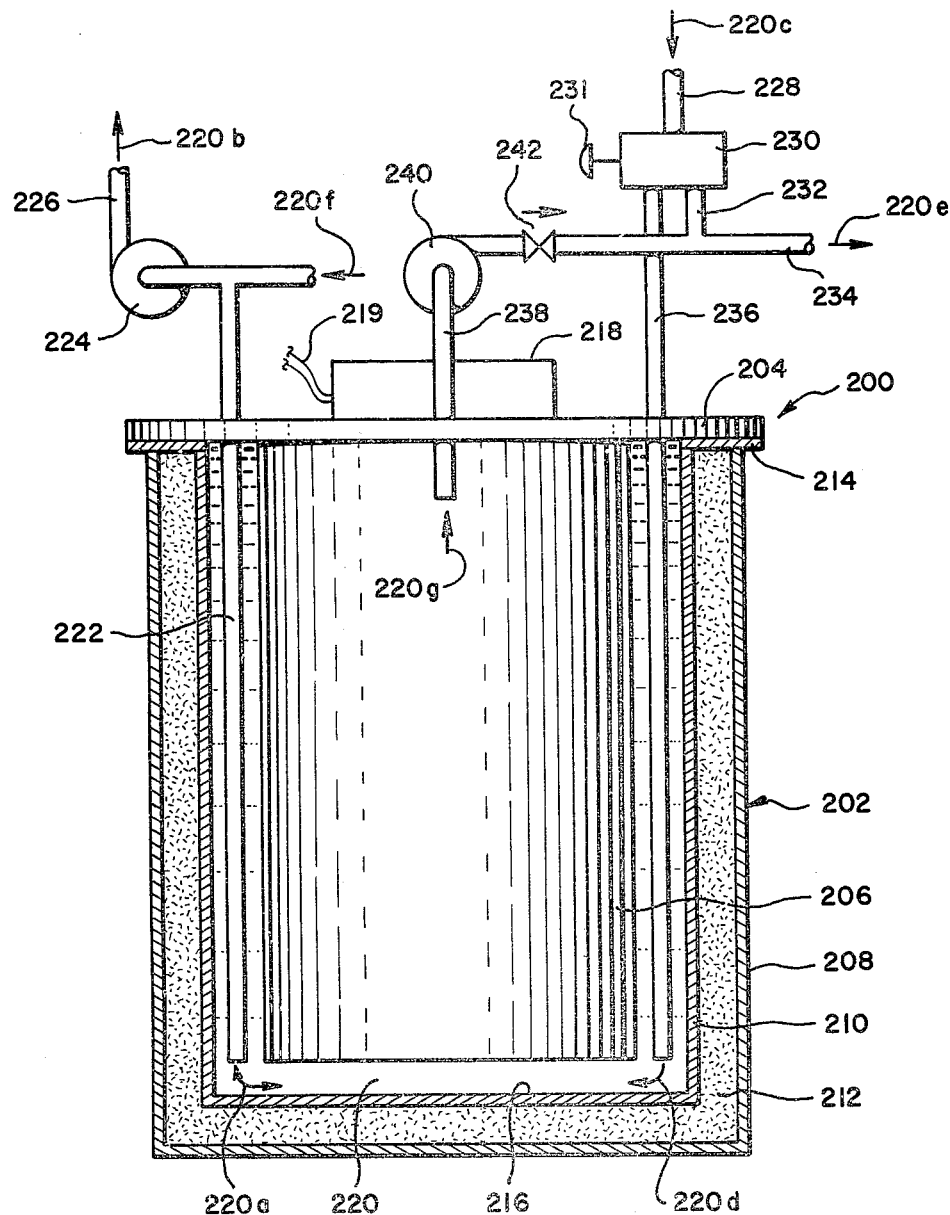
FIG. 3 is a side elevation in partial cross section of a third preferred embodiment of this invention.
Figure 4:
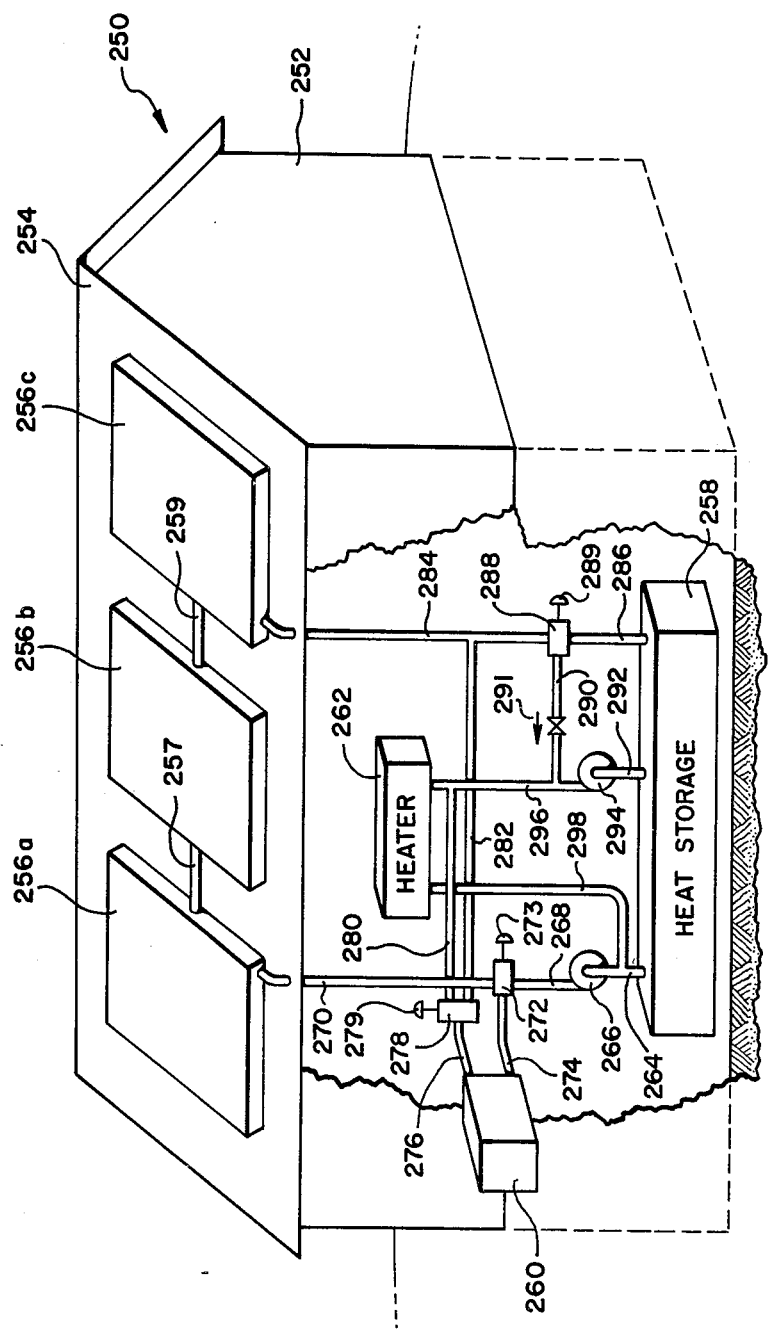
FIG. 4 is a perspective schematic with portions broken away of an overall view of the apparatus of this invention in combination with a dwelling.

With the foregoing in mind, it is to be explicitly understood that the apparatus and method of this invention shown in each of the embodiments of FIGS. 1-5, while discussed primarily as heat storage applications for heating may also be suitably modified for cooling. For example, solar absorber 12 (FIG. 1) may be configurated as a conventional solar collector powered refrigerating apparatus using a lithium bromide absorption system. Alternatively, heat pump 260 (FIG. 4) may be operated as a cooling device to discharge heat to the ambient, the heat having been drawn from either heater 262 and/or heat storage unit 258 (FIG. 4). Additionally, auxiliary heater 306 (FIG. 5) may be configurated as any suitable cooling apparatus such as a heat pump, evaporative cooler, refrigerant cooler, or the like.

Further discussion of heat storage systems can be found in DIRECT USE OF THE SUN'S ENERGY, Ferrington Daniels, Random House, Inc. New York (1964).

The Embodiment of FIG. 1

Referring now more particularly to FIG. 1, a first preferred embodiment of the heat storage apparatus of this invention is shown generally at 10. Heat storage apparatus 10 includes a solar collector 12 in fluid communication with a heat storage unit 14. Solar collector 12 is configurated as a conventional solar collector having a solar absorber panel 24 covered with a transparent cover 26. Solar flux, illustrated schematically at 28, penetrates transparent cover 26 and is absorbed as thermal energy by solar panel 24. An incoming cold fluid, illustrated schematically herein with the broken line arrow at 30 absorbs thermal energy from solar flux 28 in its passage through solar absorber 24 and departs solar panel 24 as hot fluid 32. At this point, it should be noted that, as used throughout, the term "fluid" is intended to mean either a gas or a liquid as dictated by the requirements of the particular application.

Heat storage unit 14 includes an insulated enclosure 60 with a plurality of heat storage vessels 16, 18 and 20 rotatably mounted therein. Heat storage vessels 16, 18 and 20 are configurated as cylindrical drums and are adapted to be axially and rotatably mounted in a horizontal configuration inside an insulated enclosure 60. More specifically, heat storage vessel 16 is rotatably mounted on axle 80, heat storage vessel 18 is rotatably mounted on axle 88 and heat storage vessel 20 is rotatably mounted on axle 90.

Axial rotation of each of heat storage vessels 16, 18 and 20 is accomplished by means of a motor 22 interconnected by a motor sheave 74 to a sheave 81 fixedly mounted to heat storage vessel 16 by a belt 76. Direction of travel of belt 76 is indicated by arrow 77. Belt 76 rotates heat storage vessel 16 in the direction indicated by arrow 82. Rotation of heat storage vessel 16 is translated to heat storage vessel 18 by idlers 84 and 86 turning in the directions indicated by arrows 85 and 87, respectively while rotation of heat storage vessel 18 is indicated by arrow 89. Correspondingly, rotation of heat storage vessel 18 is translated to heat storage vessel 20 by idlers 92 and 94 turning in the directions indicated by rotation arrows 93 and 95, respectively, with the direction of rotation of heat storage vessel 20 being indicated by arrow 91. Idlers 84, 86, 92 and 94 are conventional idler apparatus and may be suitably spring-biased to provide the necessary frictional engagement with the external surface of each of the appropriate heat storage vessels 16, 18 and 20. Alternatively, belt 76 could be suitably interconnected with a sheave (not shown) on each of heat storage vessels 18 and 20 thereby eliminating the respective idlers rotatably interconnecting the heat storage vessels. However, for ease of illustration and for simplicity of operation, the present configuration for providing the necessary rotational movement to heat storage vessels 16, 18 and 20 is shown with it clearly being understood that other suitable mechanical apparatus may be provided for rotating the heat storage vessels of this invention.

Each of heat storage vessels 16, 18 and 20 are filled with a heat storage solution, shown herein as salt solutions 19 and 21 in heat storage vessels 18 and 20, respectively. Heat storage vessels 16, 18 and 20 are also configurated with a plurality of internal baffles shown more particularly herein as baffles 96-99 in heat storage vessel 20. Baffles 96-99 impart the desired degree of stirring or mixing to salt solution 21 to inhibit undersirable stratification of salt crystals indicated schematically at 21a. For example, rotation of heat storage vessel 20, as indicated by arrow 91, causes each of baffles 96-99 to sequentially move in a counterclockwise direction raising salt crystals 21a until they are allowed to fall downwardly through the salt solution 21. This mixing of salt crystals 21a minimizes stratification while improving the intermixing of salt crystals 21a with salt solution 21. The same features are contained in each of heat storage vessels 16 and 18. In the absence of mixing salt crystals 21a with salt solution 21, an eventual stratification of the salt solution 21 would occur with a drastic drop in heat storage and heat transfer capability.

Insulated enclosure 60 is configured as a double wall chamber having an external wall 66, an internal wall 62, and a layer of insulation 64 sandwiched therebetween. Inner wall 62 is fabricated from a suitable fluid-impervious material having the desired strength and corrosion resistance characteristics as well as thermal properties in order to suitably contain a heat transfer fluid 31 therein.

The upper portion of enclosure 60 is configurated as an elongated neck portion or rise 68 having a cover 70 with an opening 72 therein. Opening 72 provides the necessary space for the operation of belt 76 through cover 70. Riser 78 readily accommodates fluctuation in the level of heat transfer fluid 31 while permitting the belt 76 to transfer rotational torque between motor 22 and heat storage vessel 16. It shall be understood that if a gas such as air is used as the heat transfer fluid that the liquid line is omitted and suitable well known means will be used to provide an air tight seal around either the belt or the motor itself to prevent loss of heat by air leaks.

Heat transfer fluid 31 may be air or, preferably, water with a suitable antifreeze solution therein to inhibit freezing in the event of freezing weather in the ambient surrounding solar absorber 24. Heat transfer fluid 31 completely surrounds each of heat storage vessels 16, 18 and 20 and is in intimate heat exchange relationship therewith. Heat transfer fluid 31 thereby provides the necessary heat transfer medium for transferring heat energy to and from heat storage vessels 16, 18 and 20. Cold heat transfer fluid 29 is removed from heat storage unit 14 through outlet 56 by pump 42 and pumped through conduit 58 until it is introduced as cold heat transfer fluid 30 into solar absorber 24. After absorption of thermal energy from solar flux 28, heat transfer fluid 30 is directed as hot heat transfer fluid 32 through conduit 48.

A valve 40 is coupled to an automatic controller 41 to selectively direct a predetermined quantity of hot, heat transfer fluid 32 through inlet 50 into enclosure 60 as indicated by arrow 33. Alternatively and/or in conjunction therewith, a portion of the hot, heat transfer fluid 32 may be diverted through outlet 52 as heating fluid 34 for heating purposes. The foregoing description of the flow of heat transfer fluid 31 is the flow system primarily used during those periods when solar flux 28 is being received by solar collector 12.

During periods of minimal or inadequate solar flux 28, heat transfer fluid 31 absorbs heat energy from heat storage vessels 16, 18 and 20 and is drawn from heat storage reservoir 14 by pump 38 through conduit 44 as indicated by arrow 36. Heated, heat transfer fluid 36 is directed through an outlet 46 into the heat exchange apparatus for the structure (not shown) and is returned as cold, heat transfer fluid return 35 through inlet 54 into heat storage reservoir 14.

It should be particularly noted that hot, heat transfer fluid 31 is introduced and removed from the right hand portion of heat storage reservoir 14 while cold heat transfer fluid is indicated by arrows 29 and 35 is either drawn off or introduced into, respectively, at the lower left hand side of the heat storage reservoir 14. A baffle 100 suitably inhibits cross flow between inlet 50 and outlet 56. Accordingly, a modified countercurrent heat exchange relationship is provided between heat transfer fluid 31 and heat storage vessels 16, 18 and 20.

The Embodiment of FIG. 2

Referring now to FIG. 2, a second preferred embodiment of the heat storage apparatus of this invention is illustrated generally at 110 and includes a heat storage reservoir 112 having a plurality of heat storage vessels 122, 124 and 126 therein. Heat storage reservoir 112 is configured with an outer wall 114, an inner wall 118 with an insulation 116 sandwiched therebetween. Inner wall 118 is specifically configured to be fluid impervious and with sufficient strength to support the necessary pressures, weights, and temperatures encountered.

Heat storage vessels 122, 124 and 126 are mounted in spaced relationship to the internal surface of inner wall 118 by being supported on support blocks 128, 130 and 132, respectively. Each of heat storage vessels 122, 124 and 126 are configurated as vertical cylinders and are mounted so as to be stationary versus the rotational mounting of heat storage vessels 16, 18 and 20 (FIG. 1). Heat storage vessels 122, 124 and 126 each enclose a predetermined quantity of heat storage solution 123 which stores thermal energy as in the manner set forth hereinbefore. Included within each of the respective heat storage vessels is a recirculation pump 134 consisting of a sealed stator housing 137 surrounding a pump stator 136. A pump chamber 139 is surmounted below the stator housing 137 and encloses a combination armature and pump rotor 138. The wall of stator housing 137, wall 137a separating pump stator 136 from pump rotor 138 is fabricated from a material which is both non magnetic and a non or low electrical conductor to prevent loss of magnetic coupling due to shielding or eddy currents to allow the magnetic fields of force generated in pump stator 136 to rotate pump rotor 138. The armature portion of pump rotor 138 may be of induction motor type, permanent magnet type or other types known in the art. The foregoing configuration of pump 134 and wall 137a eliminates the requirement for shafts, seals and the like, with the associated leakage problems.

Pump housing 139 includes a plurality of downwardly and tangentially directed spouts 148 and a plurality of inlet ports 135. Rotation of pump rotor 138 draws heat storage solution 123 upwardly through apertures 135 as indicated by arrows 143. Thereafter, pump rotor 138 expels heat storage solution 123 downwardly in a swirling vortex indicated by arrows 141. The swirling vortex 141 causes a resultant intermixing of salt crystals 123a with the heat storage solution 123 thereby inhibiting the excessive stratification or crystalization of the heat storage solution 123. As indicated herein, the profile of the salt crystals 123a is in a generally contoured configuration since the downwardly directed vortex 141 creates the well-known vortex pattern with the typical, resultant shaped crystal deposition shown.

Clearly, in either of the configurations illustrated in FIG. 1 or in FIG. 2, sufficient mechanical energy can be imparted to heat storage solution 123 to maintain a thoroughly mixed state of the respective crystals therein. However, in the interests of energy conservation, a limited amount of crystal deposition in the bottom of the heat storage vessel is not believed to be detrimental and can be the result of a carefully predetermined tradeoff between energy input and loss of efficiency resulting from the crystal buildup. To minimize energy input to the pump the linear speed of the rotor may be reduced by use of a multiple stator, driving frequency reduction, or by use of small rotors diameters. Another method of reducing excess energy usage by the pump is to use a variable duty cycle which is dependent on the amount of heat required to be added or withdrawn from the storage system. The pumps may also be sequentially operated as required to minimize the peak loading which would otherwise occur if all pumps were operating simultaneously. However, excessive crystal buildup is clearly undesirable and it is, therefore, one goal of this invention to preclude such a crystal stratification or buildup.

Each of heat storage vessels 122, 124 and 126 are immersed in a heat transfer fluid 120. Cooled heat transfer fluid 120 is drawn off as indicated at arrow 153 through an outlet 154 by pump 156 and is directed through a conduit 158 to a suitable heater such as the solar energy collector 12 (FIG. 1). Heated heat transfer fluid 120 is returned, as indicated by arrow 161, through conduit 162 where it is selectively directed by a valve 164 through an inlet 166 or a heating conduit 168. Valve 164 includes a controller 165 which is thermostatically controlled so as to direct the heated heat transfer fluid either into the heat storage apparatus 112 as indicated by arrow 167 or directed by valve 164 to the heating conduit as indicated by arrow 169. Accordingly, depending upon the condition of the solar collector 12 (FIG. 1) and the heating requirements of the structure (not shown), controller 165 will suitably control valve 164 to direct the heated heat transfer fluid to the desired location.

During periods of insufficient solar flux, heated heat transfer fluid 120 is drawn from heat storage reservoir 112 as indicated by flow arrow 171 through a conduit 172 by pump 174. Thereafter a valve 176 directs the flow of fluid through a conduit 178 into the heating conduit 168. Valve 176 is also configured as a one-way check valve to prevent reverse flow of heat transfer fluid 120. Spent heat transfer fluid 120 is returned at flow arrow 170 through conduit 180 where it recirculates through heat storage reservoir 112.

Circulation of heat transfer fluid 120 through heat storage reservoir 112 is directed in a circuitous path by baffles 150 and 152. For example, incoming, cold heat transfer fluid 120 entering through conduit 180 is directed around and in thermal contact with heat storage vessel 122 and over baffle 150 into thermal contact with heat storage vessel 124. Thereafter, heat transfer fluid 120 passes underneath baffle 152 and is brought into intimate heat exchange relationship with heat storage vessel 126. Thereafter, the heated heat transfer fluid 120 may be drawn off as indicated at flow arrow 171.

During periods of sunshine, the reverse operation is true wherein cold heat transfer fluid 120 is withdrawn at flow arrow 153 and directed to the solar heating apparatus 12 (FIG. 1). The heated heat transfer fluid is returned adjacent the bottom of heat storage vessel 126 at flow arrow 167 and the colder portions thereof traverse underneath baffle 152 into heat exchange relationship with heat storage vessel 124. Thereafter, heat transfer fluid 120 passes over baffle 150 and downwardly in heat exchange relationship with heat storage vessel 122 and is subsequently recycled as set forth hereinbefore.

Referring now more particularly to FIG. 3, a third preferred embodiment of this invention is illustrated herein as heat storage unit 200 and includes a heat storage chamber 202 having a heat storage vessel 206 mounted therein and surrounded with a heat transfer fluid 220. Heat storage vessel 206 is mounted to a cover 204 resting on an upper rim 214 of heat storage chamber 202. Heat storage chamber 202 is configurated with an outer wall 208 an inner wall 210 and having an insulative layer 212 sandwiched therebetween. Inner face 216 of inner wall 210 is fabricated as a fluid-impervious membrane which is not degraded by the temperature conditions or fluids encountered by contact with heat transfer fluid 220.

A circulation pump 218 is attached to the upper surface of cover 204 and is substantially comparable to pump 139 (FIG. 2) in that an armature or pump rotor (not shown) similar to pump rotor 138 (FIG. 2) suitably agitates and otherwise inhibits the excessive stratification of the salt solution in heat storage vessel 206 as set forth hereinbefore with respect to FIG. 2. Electrical energy for pump 218 is provided through electrical leads 219.

Conduits 222, 236 and 238 pass through cover 204 and provide fluid communication for heat transfer fluid 220 as will be set forth more fully hereinafter. In operation, cold heat transfer fluid 220 is withdrawn as fluid 220a through conduit 222 by pump 224. Pump 224 forces heat transfer fluid 220 through conduit 226 as indicated by flow arrow 220b to a solar collector 12 (FIG. 1) or the like and returns the heated heat transfer fluid 220 as indicated by flow arrow 220c through conduit 228. A control valve 230 operated by a controller 231 directs the heated heat transfer fluid 220c either through conduit 232 into a header 234 or inlet conduit 236. Heated heat transfer fluid directed through header 234 is utilized for heating purposes as indicated by flow arrow 220e. The heated heat transfer fluid 220 directed through inlet conduit 236 is introduced adjacent the bottom of heat storage vessel 206 as indicated by flow arrow 220d. Heat energy in the heated heat transfer fluid at 220d is exchanged with the salt solution in heat storage vessel 206 as set forth hereinbefore.

After removal of thermal energy from heat transfer fluid 220e, the cooled heat transfer fluid returns to the system as indicated at flow arrow 220f where it is either reintroduced into the heat storage chamber 202 as indicated at 220a or directed as flow arrow 220b by pump 224 and recirculated as before.

During periods of inadequate solar flux, thermal energy is removed from heat storage vessel 206 by withdrawing heat transfer fluid 220g with pump 240 through conduit 238. A check valve 242 prevents reverse flow through pump 240 when pump 224 is in operation. The fluid then travels as heated heat transfer fluid 220e where the thermal energy therein is suitably used for heating purposes. The spent fluid is returned at 220f and recirculated as set forth hereinbefore.

Referring now to FIG. 4, an overall heat storage and utilization apparatus is shown herein generally at 250 as it is incorporated in a dwelling 252 and includes a heat storage chamber 258, a heater 262, an auxiliary heater or heat pump 260, and a plurality of solar collectors 256a–256c. Additionally, miscellaneous control and pump equipment is shown as will be set forth more fully hereinafter.

Solar collectors 256a–256c are mounted on a roof 254 of structure 252 or in some other suitable location and are suitably interconnected by conduits 257 and 259, respectively. Cold heat transfer fluid is introduced into solar collectors 256a–256c through conduit 270 and heated heat transfer fluid is returned to the heat storage/utilization apparatus of this invention through conduit 284. A plurality of valves, shown herein as valve 278 operated by a controller 279, valve 272 operated by controller 273 and valve 288 operated by controller 289, are suitably interconnected with various conduits for the purpose of effectively controlling the direction of flow of heat transfer fluid. For example, valve 288 directs heat transfer fluid either through conduit 286 or conduit 290 where it is either directed into heat storage unit 258 or through check valve 291 for utilization in heater 262. This portion of the heat storage apparatus of this portion of the illustrated embodiment of this invention is substantially similar to that shown in each of FIG. 1, FIG. 2, and FIG. 3.

The particular heat storage/utilization apparatus illustrated in FIG. 4 primarily differs from the previous embodiments in that an auxiliary heater 260 is included and may, advantageously, be a heat pump suitably interconnected through conduits 274 and 276 through valves 272 and 278 for the purpose of serving as an auxiliary heating unit. For example, during periods of inadequate solar flux being received by solar collectors 256a–256c and, correspondingly, when the thermal energy stored in heat storage unit 258 is depleted, heat pump 260 may be suitably activated to provide heated heat transfer fluid. The heated heat transfer fluid is directed through conduit 276 by valve 278 to heater 262 or through conduit 282 into heat storage unit 258. Cold heat transfer fluid for heat pump 260 is provided through conduit 274 through valve 272 and pump 266 either from conduit 298 or conduit 264. Conduit 298 serves as a return line for heater 262 while conduit 264 is in fluid communication into heat storage unit 258.

Figure 5:
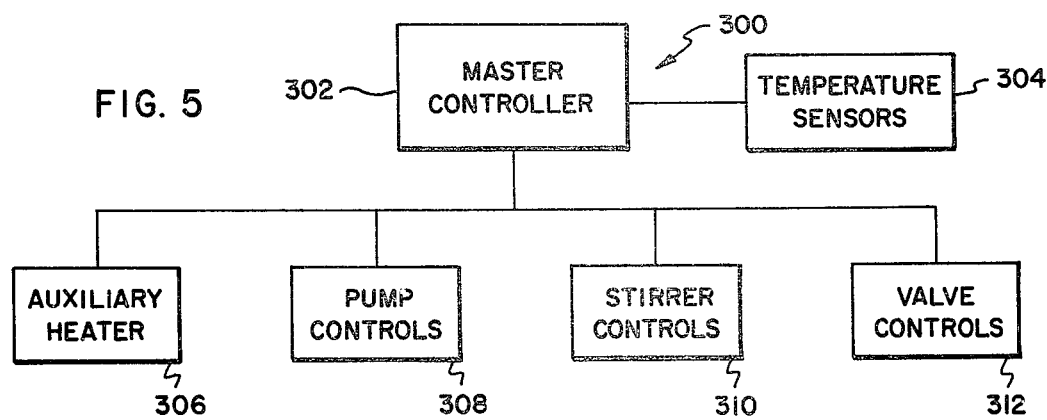
FIG. 5 is a block diagram of the controller arrangement for this invention.

Referring now more particularly to FIG. 5, a block diagram is set forth illustrating the interconnection of the various components of the apparatus of this invention illustrated in any of FIGS. 1–4. In particular, the controller apparatus of this invention is shown generally at 300 and includes a master controller 302 which is used to suitably operate auxiliary heater 306, pump controls 308, stirrer controls 310, and valve controls 312 in response to signals received from temperature sensors 304. Auxiliary heater 306 is comprobable to heat pump 260 (FIG. 4). Pump controls 308 may be selectively interconnected to each of pumps 38 and 42 (FIG. 1), pumps 156 and 174 (FIG. 2); pumps 224 and 240 (FIG. 3) or pumps 266 and 294 (FIG. 4). Stirrer controls 310 may be selectively interconnected to motor 220 for turning each of heat storage containers 16, 18 and 20 (FIG. 1); pumps 139 and 146 (FIG. 2) or pump 218 (FIG. 3). Valve controls 312 are set forth in FIG. 1 as valve controller 41; valve controller 165 (FIG. 2); valve controller 231 (FIG. 3) or valve controllers 273, 279 and 289 (FIG. 4). Accordingly, the various temperatures sensed both in the solar collector apparatus 12 (FIG. 1) or solar collectors 256a-256c (FIG. 4); or the various heat transfer fluids and/or heat storage solutions in each of the embodiments illustrated herein thereby serve as a basis for activation of master controller 302 and the appropriate equipment controlled thereby.

Importantly, in any of the preferred embodiments illustrated herein, thermal energy is efficiently stored in a relatively small space and relatively economically by the apparatus and method of this invention. Efficiency of the heat storage apparatus of this invention is maintained by inhibiting the crystalization or stratification of the heat storage medium by affectively recirculating or otherwise stirring the heat storage medium.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A heat storage apparatus comprising:
    a heat storage medium having a latent heat of reaction as the primary heat storage mechanism;
    container means for the heat storage medium;
    mixing means in the container comprising a rotatable impeller magnetically coupled to a stator outside of said container for mixing the heat storage medium to inhibit stratification of the heat storage medium;
    enclosure means for insulatively enclosing the container means; and
    heat transfer means for exchanging heat energy with the heat storage medium.

2. The heat storage system defined in claim 1 wherein the mixing means includes control means operable to activate the mixing means as a function of heat demand.

3. The heat storage system defined in claim 2 wherein the control means further comprises peak demand control means to minimize peak loading of the stirring means.

4. The heat storage apparatus of claim 1 wherein the heat transfer means is water.

5. The heat storage apparatus of claim 1 wherein the heat transfer means is in fluid communication with a heat source.

6. The heat storage apparatus of claim 5 wherein the heat source is a solar collector.

7. The heat storage apparatus of claim 5 wherein the heat source is a structure and the fluid heat transfer medium is in heat exchange relationship with a coolant source.

8. The heat storage apparatus defined in claim 1 wherein the heat storage medium comprises a salt selected from the group consisting of a mixture of sodium sulfate decahydrate and water; sodium thiosulfate and water; and sodium sulfate decahydrate, sodium chloride and water.

9. The heat storage apparatus defined in claim 1 wherein the container means comprises a plurality of vessels with heat storage medium in each of the vessels, each vessel including a rotatable impeller.

10. The heat storage apparatus defined in claim 1 wherein the enclosure means comprises a framework for supporting the container and baffle means for directing flow of a heat transfer medium through the enclosure.

11. The heat storage apparatus defined in claim 1 wherein the heat transfer means comprises a heat transfer fluid and fluid flow means for bringing the heat transfer fluid in heat exchange relationship with the container means.

12. A heat storage apparatus comprising:
    a heat storage medium having a latent heat of reaction as the primary heat storage mechanism;
    container means for the heat storage medium;
    mixing means comprising pump means for mixing the heat storage medium to inhibit stratification of the heat storage medium, the pump means comprising a rotatable armature operable as an impellor and a stator for rotating the armature, the stator being sealed from the armature by a nonconductive divider;
    enclosure means for insulatively enclosing the container means; and
    heat transfer means for exchanging heat energy with the heat storage medium.

13. A heat storage system comprising:
    a heat source;
    a heat utilization site;
    a heat storage unit comprising at least one container having a heat storage medium therein, the heat storage medium having a latent heat of reaction as the primary heat storage mechanism;
    a pump in the container, said pump comprising a rotatably impeller magnetically coupled to a stator outside of said container, the pump serving as a mixing means for mixing the heat storage medium to inhibit stratification of the heat storage medium;
    heat transfer means for transferring heat energy between the heat source and the heat storage unit and to the heat utilization site; and
    control means for selectively controlling the heat source, the heat utilization site, the heat storage unit, and the heat transfer means.

14. The heat storage system defined in claim 13 wherein the heat source comprises a heat source selected from the group consisting of a solar collector, an auxilliary heater, and a heat pump.

15. The heat storage system defined in claim 13 wherein heat utilization site is configurated as a heat absorption site and the heat storage medium is operable at a temperature lower than the heat absorption site to thereby absorb heat therefrom and the heat source comprised a heat pump means operable to remove heat from the heat storage medium.

* * * * *